(12) United States Patent
Liu et al.

(10) Patent No.: US 11,276,227 B2
(45) Date of Patent: Mar. 15, 2022

(54) OBJECT RENDERING METHOD AND APPARATUS, STORAGE MEDIUM, AND ELECTRONIC DEVICE USING A SIMULATED PRE-INTEGRATION MAP

(71) Applicant: TENCENT TECHNOLOGY (SHENZHEN) COMPANY LIMITED, Shenzhen (CN)

(72) Inventors: Dian Liu, Shenzhen (CN); Yucheng Qu, Shenzhen (CN); Chaoyu Hua, Shenzhen (CN); Weiwei Li, Shenzhen (CN); Jianeng Lu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/165,876

(22) Filed: Feb. 2, 2021

(65) Prior Publication Data

US 2021/0192838 A1 Jun. 24, 2021

Related U.S. Application Data

(63) Continuation of application No. PCT/CN2020/120152, filed on Oct. 10, 2020.

(30) Foreign Application Priority Data

Dec. 24, 2019 (CN) .......................... 201911349659.7

(51) Int. Cl.
*G06T 15/50* (2011.01)
*G06T 15/04* (2011.01)
(Continued)

(52) U.S. Cl.
CPC ............ *G06T 15/506* (2013.01); *A63F 13/52* (2014.09); *A63F 13/525* (2014.09); *A63F 13/56* (2014.09);
(Continued)

(58) Field of Classification Search
CPC .............. G06T 15/506; G06T 2210/62; G06T 15/00–87; A63F 13/52; A63F 13/525; A63F 13/56; A63F 2300/6646
See application file for complete search history.

(56) References Cited

U.S. PATENT DOCUMENTS

| 5,947,823 A * | 9/1999 | Nimura ................... A63F 13/10 463/32 |
| 8,269,772 B1 * | 9/2012 | Smits ...................... G06T 13/80 345/426 |

(Continued)

FOREIGN PATENT DOCUMENTS

| CN | 104268922 A | 1/2015 |
| CN | 104484896 A | 4/2015 |

(Continued)

OTHER PUBLICATIONS

Akenine-Moller, Thomas and Eric Haines. "Real-Time Rendering." 2nd ed. (2002), pp. 73-82. (Year: 2002).*

(Continued)

*Primary Examiner* — Daniel F Hajnik
(74) *Attorney, Agent, or Firm* — Anova Law Group, PLLC

(57) ABSTRACT

This application discloses an object rendering method and apparatus, a storage medium, and an electronic device. The method includes obtaining a target pixel point to be processed in a diffuse map and a normal map of a to-be-rendered object; determining a first rendering color of the target pixel point according to a pre-integration simulation module and a normal direction parameter corresponding to the target pixel point, the pre-integration simulation module being configured to simulate a pre-integration map, the pre-integration map representing a correspondence between curvature and a color band, and the normal direction parameter representing a normal direction of the target pixel point (Continued)

in a world space coordinate system; determining a target rendering color of the target pixel point according to the first rendering color; and rendering the target pixel point by using the target rendering color.

17 Claims, 7 Drawing Sheets

(51) Int. Cl.
*G06T 15/80* (2011.01)
*A63F 13/525* (2014.01)
*G06T 15/20* (2011.01)
*A63F 13/52* (2014.01)
*A63F 13/56* (2014.01)

(52) U.S. Cl.
CPC .............. *G06T 15/04* (2013.01); *G06T 15/20* (2013.01); *G06T 15/80* (2013.01); *A63F 2300/6646* (2013.01); *G06T 2210/62* (2013.01)

(56) References Cited

U.S. PATENT DOCUMENTS

| | | | |
|---|---|---|---|
| 10,037,592 B2 | 7/2018 | Kolb, V et al. | |
| 2011/0069069 A1* | 3/2011 | Engel | G06T 15/08 345/426 |
| 2015/0348285 A1* | 12/2015 | Wang | G06T 15/04 345/582 |
| 2017/0116771 A1 | 4/2017 | Aeng | |
| 2018/0253884 A1* | 9/2018 | Burnett, III | G06T 15/005 |
| 2018/0308276 A1 | 10/2018 | Cohen et al. | |
| 2019/0156561 A1 | 5/2019 | Inaba | |

FOREIGN PATENT DOCUMENTS

| | | |
|---|---|---|
| CN | 104966312 A | 10/2015 |
| CN | 107358643 A | 11/2017 |
| CN | 108564646 A | 9/2018 |
| CN | 109377546 A | 2/2019 |
| CN | 109598777 A | 4/2019 |
| CN | 109685869 A | 4/2019 |
| CN | 109934903 A | 6/2019 |
| CN | 110009720 A | 7/2019 |
| CN | 110196746 A | 9/2019 |
| CN | 110827391 A | 2/2020 |
| CN | 111009026 A | 4/2020 |

OTHER PUBLICATIONS

The World Intellectual Property Organization (WIPO) International Search Report for PCT/CN2020/120152 dated Jan. 12, 2021 8 Pages (including translation).

Eric Penner, Pre-integrated Skin Shading, SIGGRAPH 2011, Advances in Real-Time Rendering in Games, Retrieved from the Internet: URL: https://www.slideshare.net/leegoonz/penner-preintegrated-skin-rendering-siggraph-2011-advances-in-realtime-rendering-course, Dec. 31, 2011 (Dec. 31, 2011), Slide 4-77. 93 pages.

Eric Penner et al., Pre-integrated Skin Shading, GPU PRO2: Advanced Rendering Techniques, Dec. 31, 2011 (Dec. 31, 2011), pp. 41-54. 18 pages.

The State Intellectual Property Office of the People's Republic of China (SIPO) Office Action 1 for 201911349659.7 dated Sep. 7, 2020 11 Pages (including translation).

Zhong-Kui Luo et al., "Physical dynamics based modeling and rendering of smoke," Computer Engineering and Design, Dec. 31, 2010 (Dec. 31, 2010), pp. 4855-4857,4928. 4 pages.

Joao Manuel Maciel Linhares et al., "Color rendering of art paintings under CIE illuminants for normal and color deficient observers," Journal of the Optical Society of America A Optics Image science & Vision, 2009. 10 pages.

Eric Penner, "Pre-integrated skin shading," Siggraph 2011 Advances Real-Time Rendering Course, Retrieved from the Internet:URL: http://advances.realtimerendering.com/s2011/Penner%20-%20Pre-Integrated%20Skin%20Rendering%20(Siggraph%202011%20Advances%20in%20Real-Time%20Rendering%20Course).pptx 92 pages.

* cited by examiner

OBJECT RENDERING METHOD AND APPARATUS, STORAGE MEDIUM, AND ELECTRONIC DEVICE USING A SIMULATED PRE-INTEGRATION MAP

RELATED APPLICATIONS

This application claims priority to PCT Application No. PCT/CN2020/120152, filed on Oct. 10, 2020, which in turn claims priority to Chinese Patent Application No. 2019113496597, entitled "OBJECT RENDERING METHOD AND APPARATUS, STORAGE MEDIUM, AND ELECTRONIC DEVICE" filed with the National Intellectual Property Administration, PRC on Dec. 24, 2019, each of which is incorporated by reference in its entirety.

FIELD OF THE TECHNOLOGY

This application relates to the field of computers, and specifically, to an object rendering method and apparatus, a storage medium, and an electronic device.

BACKGROUND OF THE DISCLOSURE

Skin is one of the most important aspects in rendering quality of a game character. Generally, there are a large number of game characters in a game. A game player is quite sensitive to face features of a game character. The most important physical feature on face skin-translucency is a difficult issue in image rendering. Most easily computed illumination models are based on surface reflection without light absorption or penetration. The translucency feature of face skin is commonly referred to as subsurface scattering in academia. This feature is quite conspicuously shown on thin body parts of a human body such as ears in a backlighting condition.

In order to show such a biological feature (the scattering phenomenon on parts such as ears, skin, nose, or fingers), and diversify scattering effects for different characters, a pre-integration map is used for rendering in the related art. However, the solution of rendering through a pre-integration map requires multiple sampling and requires real-time calculation of a position on the map corresponding to a pixel that needs to be rendered currently. As a result, the solution is resource consuming and is inapplicable to a terminal device (for example, a mobile phone terminal) that requires high processing performance.

Therefore, in the related art, there is a problem of high resource consumption in character rendering. Embodiments of this application solve this problem and other technical problems.

SUMMARY

According to various embodiments of this application, an object rendering method and apparatus, a storage medium, and an electronic device are provided.

An object rendering method is provided. The method is performed by an electronic device. The method includes obtaining a target pixel point to be processed in a diffuse map and a normal map of a to-be-rendered object; determining a first rendering color of the target pixel point according to a pre-integration simulation module and a normal direction parameter corresponding to the target pixel point, the pre-integration simulation module being configured to simulate a pre-integration map, the pre-integration map representing a correspondence between curvature and a color band, and the normal direction parameter representing a normal direction of the target pixel point in a world space coordinate system; determining a target rendering color of the target pixel point according to the first rendering color; and rendering the target pixel point by using the target rendering color.

An object rendering apparatus is provided. The apparatus incudes a first obtaining unit, configured to obtain a target pixel point to be processed in a diffuse map and a normal map of a to-be-rendered object; a first determining unit, configured to determine a first rendering color of the target pixel point according to a pre-integration simulation module and a normal direction parameter corresponding to the target pixel point, the pre-integration simulation module being configured to simulate a pre-integration map, the pre-integration map representing a correspondence between curvature and a color band, and the normal direction parameter representing a normal direction of the target pixel point in a world space coordinate system; a second determining unit, configured to determine a target rendering color of the target pixel point according to the first rendering color; and a rendering unit, configured to render the target pixel point by using the target rendering color.

A non-transitory computer-readable storage medium is provided, the computer-readable storage medium storing a computer program. The computer program, when executed by one or more processors, causes the one or more processors to perform the foregoing object rendering method.

Details of one or more embodiments of this application are provided in the accompanying drawings and descriptions below. Other features and advantages of this application become more obvious with reference to the specification, the accompanying drawings, and the claims.

BRIEF DESCRIPTION OF THE DRAWINGS

The accompanying drawings described herein are used to provide a further understanding of this application, and form a part of this application. Exemplary embodiments of this application and descriptions thereof are used to explain this application, and do not constitute any inappropriate limitation to this application. In the drawings.

DESCRIPTION OF EMBODIMENTS

To make a person skilled in the art better understand solutions of this application, the technical solutions in the embodiments of this application are clearly and completely described below with reference to the accompanying drawings in the embodiments of this application. Apparently, the described embodiments are merely some rather than all of the embodiments of this application. All other embodiments obtained by a person of ordinary skill in the art based on the embodiments of this application without creative efforts shall fall within the protection scope of this application.

The terms such as "first" and "second" in the specification, claims, and accompanying drawings of this application that are intended to distinguish between similar objects rather than describe a particular sequence or a chronological order. It is to be understood that the data termed in such a way are interchangeable in proper circumstances, so that the embodiments of this application described herein can be implemented in other orders than the order illustrated or described herein. In addition, the terms "include" and "have" and any other variants are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

Figure 1:
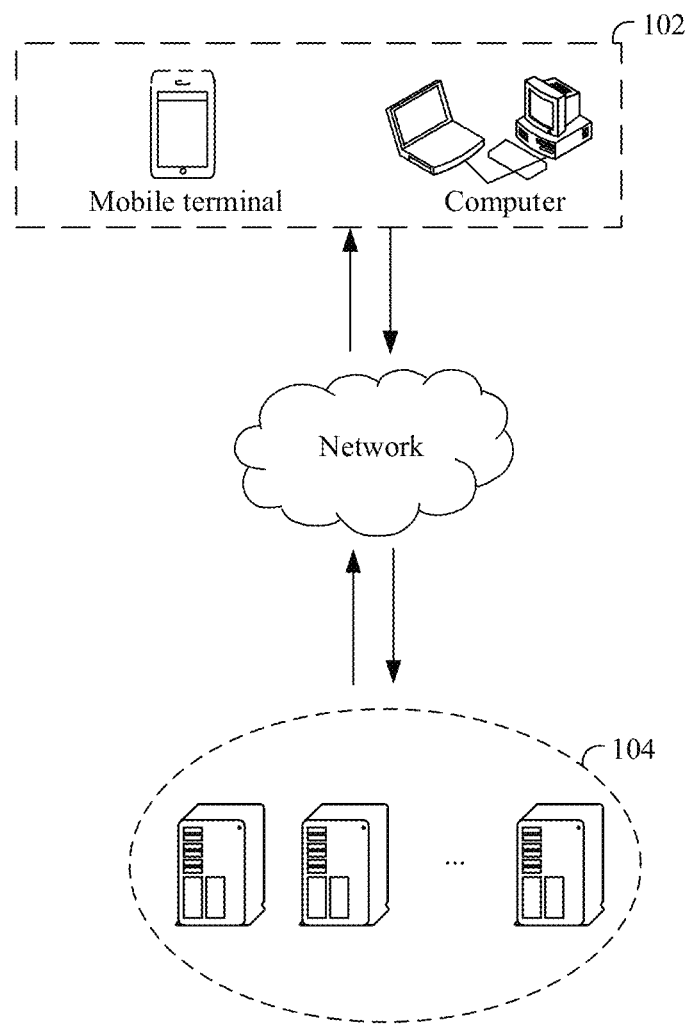
FIG. 1 is a schematic diagram of an application environment of an object rendering method according to an embodiment of this application.

According to one aspect of the embodiments of this application, an object rendering method is provided. In some embodiments, the object rendering method may be, but is not limited to being, applicable to an application environment shown in FIG. 1. As shown in FIG. 1, a client (for example, Android, iOS, or Web) related to a to-be-rendered object is run on a terminal device 102. A target pixel point to be processed in a diffuse map and a normal map of the to-be-rendered object may be obtained through the client, and the target pixel point to be processed may be transmitted to a server 104 through a network. The server 104 may be a backend server of the client. The server 104 determines a first rendering color of the target pixel point according to a pre-integration simulation module and a normal direction parameter corresponding to the target pixel point. The pre-integration simulation module is configured to simulate a pre-integration map. The pre-integration map is used for representing a correspondence between curvature and a color band. The normal direction parameter is used for representing a normal direction of the target pixel point in a world space coordinate system. The server 104 determines a target rendering color of the target pixel point according to the first rendering color; and renders the target pixel point by using the target rendering color. The foregoing is merely an example, and this embodiment of this application is not limited thereto.

In the terminal device 102, a target pixel point to be processed in a diffuse map and a normal map of a to-be-rendered object is obtained. In some embodiment, the terminal device 102 may perform: determining a first rendering color of the target pixel point according to a pre-integration simulation module and a normal direction parameter corresponding to the target pixel point, the pre-integration simulation module being configured to simulate a pre-integration map, the pre-integration map being used for representing a correspondence between curvature and a color band, and the normal direction parameter being used for representing a normal direction of the target pixel point in a world space coordinate system; determining a target rendering color of the target pixel point according to the first rendering color; and rendering the target pixel point by using the target rendering color.

In some embodiments, the terminal device may be a terminal device provided with a client and may include, but is not limited to, at least one of the following: a mobile phone (for example, an Android mobile phone, or an iOS mobile phone), a notebook computer, a tablet computer, a palmtop computer, a mobile Internet device (MID), a PAD, a desktop computer, and the like. The network may include, but is not limited to, a wired network and a wireless network. The wired network includes: a local area network, a metropolitan area network, and a wide area network. The wireless network includes Bluetooth, Wi-Fi, and another network implementing wireless communication. The server may be an independent server, or may be a cluster server including a plurality of servers. The foregoing is merely an example, and this embodiment is not limited thereto.

Figure 2:
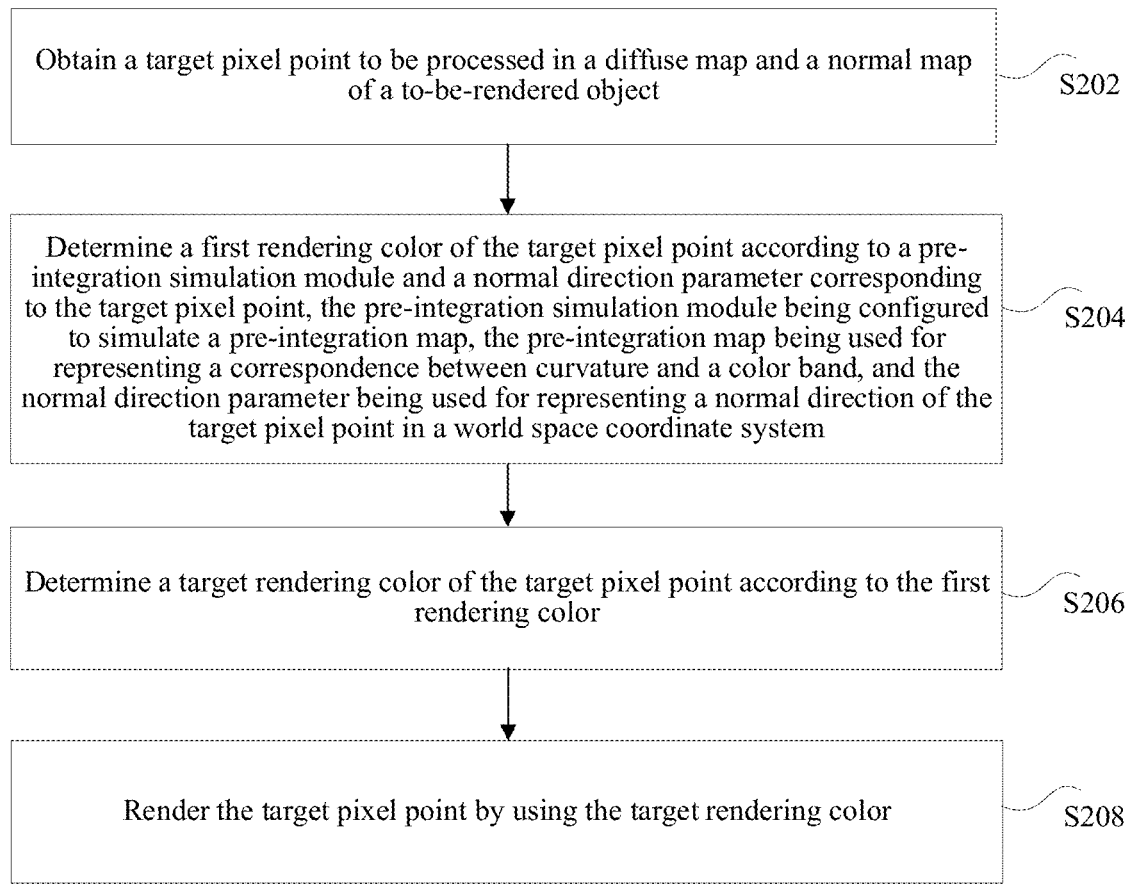
FIG. 2 is a schematic flowchart of an object rendering method according to an embodiment of this application.

In some embodiments, the method may be performed by a server, or performed by a terminal device, or performed by a server and a terminal device jointly. In this embodiment, description is made by using an example in which the method is performed by a terminal device (for example, the terminal device 102). As shown in FIG. 2, a process of the object rendering method may include the following steps:

S202: Obtain a target pixel point to be processed in a diffuse map and a normal map of a to-be-rendered object.

S204: Determine a first rendering color of the target pixel point according to a pre-integration simulation module and a normal direction parameter corresponding to the target pixel point, the pre-integration simulation module being configured to simulate a pre-integration map, the pre-integration map being used for representing a correspondence between curvature and a color band, and the normal direction parameter being used for representing a normal direction of the target pixel point in a world space coordinate system.

S206: Determine a target rendering color of the target pixel point according to the first rendering color.

S208: Render the target pixel point by using the target rendering color.

In some embodiments, the object rendering method may be, but is not limited to being, used in a scenario in which a client plays a virtual game.

In this embodiment, first, a target pixel point to be processed in a diffuse map and a normal map of a to-be-rendered object is obtained, then, a first rendering color of the target pixel point is determined according to a pre-integration simulation module and a normal direction parameter corresponding to the target pixel point. The pre-integration simulation module is configured to simulate a pre-integration map, the pre-integration map is used for representing a correspondence between curvature and a color band, and the normal direction parameter is used for representing a normal direction of the target pixel point in a world space coordinate system. Next, a target rendering color of the target pixel point is determined according to the first rendering color. Finally, the target pixel point is rendered by using the target rendering color. Through the foregoing technical solution, calculation of a corresponding position of a target pixel point on a map can be avoided, thereby saving the expenditure, and improving the efficiency of rendering a to-be-rendered object.

The object rendering method in this embodiment is described below with reference to FIG. 2.

In S202, the target pixel point to be processed in the diffuse map and the normal map of the to-be-rendered object is obtained.

Figure 3:
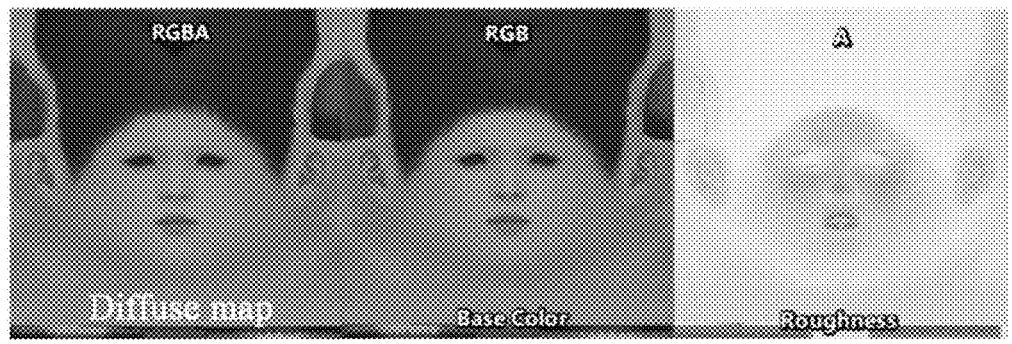
FIG. 3 is a schematic diagram of a diffuse map according to an embodiment of this application.
Figure 4:
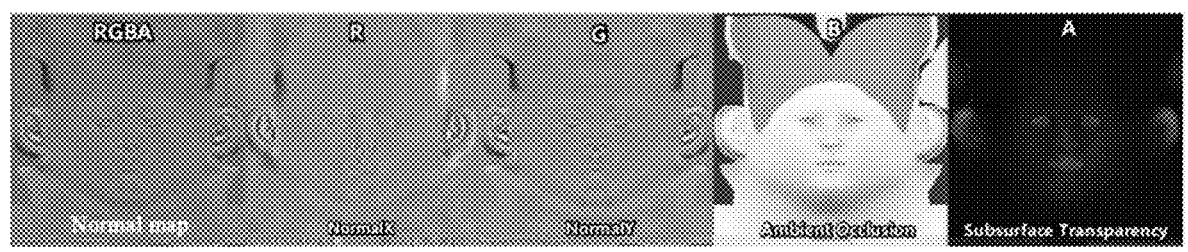
FIG. 4 is a schematic diagram of a normal map according to an embodiment of this application.

In some embodiments, the diffuse map and the normal map may be understood as map resources in a game. The diffuse map may be understood as showing the reflection and the color of an object surface in a game. That is, the diffuse map may show, when the object is illuminated by light, the color shown on the object and the intensity of the light. The normal map may be understood as defining a degree of inclination or a normal of a surface. The normal map may record a parameter (X, Y, Z) of space coordinates into a pixel (R, G, B). Through the normal map, a degree of inclination of an object surface seen by a user can be changed. The to-be-rendered object may be understood as a character in a game. The character may include parts such as a face feature, ears, skin, nose, and fingers. FIG. 3 is the diffuse map of the to-be-rendered object. FIG. 4 is the normal map of the to-be-rendered object.

Then, the target pixel point to be processed in the diffuse map and the normal map of the to-be-rendered object is obtained. The size of the diffuse map is the same as the size of the normal map, and the target pixel point is at the same position of the diffuse map and the normal map.

In S204, the first rendering color of the target pixel point is determined according to the pre-integration simulation module and the normal direction parameter corresponding to the target pixel point, the pre-integration simulation module being configured to simulate the pre-integration map, the pre-integration map being used for representing the correspondence between the curvature and the color band, and the normal direction parameter being used for representing the normal direction of the target pixel point in the world space coordinate system.

In some embodiments, the pre-integration simulation module may simulate a process that the pre-integration map renders the to-be-rendered object.

Figure 5:
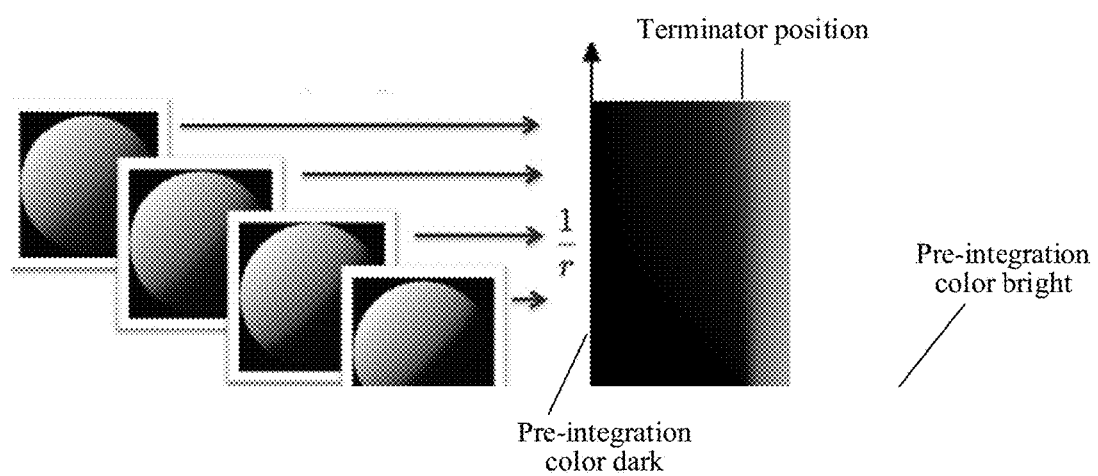
FIG. 5 is a schematic diagram of a pre-integration map according to an embodiment of this application.

The pre-integration map is used for showing the correspondence between the curvature and the color band. As shown in FIG. 5, the pre-integration map technology performs, by using a square map on the right side of FIG. 5, one-to-one mapping on curvature data and data calculated through the Lambert's law to obtain a color of light of subsurface scattering. In an implementation, when there is relatively low curvature (that is, 1/r is quite small, that is, a skin surface such as a cheek is slightly curved), the color band is from black to white, which means that the scattering degree of the skin surface is extremely low. When there is relatively high curvature, the color band is from black to red to white, which means that when there is relatively high curvature (that is, the skin surface is extremely curved), the scattering degree of the skin surface is higher. It may be understood that, because FIG. 5 is a grayscale picture, colors in FIG. 5 do not represent a realistic color effect.

The first rendering color of the target pixel point may be determined according to the pre-integration simulation module and an illumination parameter corresponding to the target pixel point. The illumination parameter includes the normal direction parameter, the normal direction parameter being used for representing the normal direction of the target pixel point in the world space coordinate system.

In S206, the target rendering color of the target pixel point is determined according to the first rendering color.

In some embodiments, after the first rendering color of the target pixel point is obtained through S204, the target rendering color of the target pixel point may be determined according to the first rendering color. Using a skin color of face features as an example, the target rendering color may be understood as the transparency and a transmitted color of the skin.

In S208, the target pixel point is rendered by using the target rendering color.

In some embodiments, after the target rendering color of the target pixel point is obtained through S206, the target rendering color may be used to render the target pixel point. It may be understood that the to-be-rendered object has a plurality of pixel points. All pixel points included in the to-be-rendered object may be rendered through S202-S208 to finally obtain the rendered to-be-rendered object, so that the to-be-rendered object presents more realistic transparency and transmitted color.

In some embodiments, the determining a first rendering color of the target pixel point according to a pre-integration simulation module and a normal direction parameter corresponding to the target pixel point may include: determining the first rendering color of the target pixel point according to a pre-integration color bright parameter, a pre-integration color dark parameter, a pre-integration range parameter, a terminator position parameter, the normal direction parameter, and a light source direction parameter, the light source direction parameter being used for representing a light source direction of a preset light source used during rendering of the to-be-rendered object, input parameters of a pre-integration simulation function included in the pre-integration simulation module including the pre-integration color bright parameter, the pre-integration color dark parameter, the pre-integration range parameter, and the terminator position parameter, and the pre-integration simulation function being used for simulating the pre-integration map according to the pre-integration color bright parameter, the pre-integration color dark parameter, the pre-integration range parameter, and the terminator position parameter. The pre-integration range parameter is used for representing a first integration range and a second integration range, the pre-integration color bright parameter is used for representing a first color in the first integration range, the pre-integration color dark parameter is used for representing a second color in the second integration range, the first color is brighter than the second color, and the terminator position parameter is used for representing a terminator position.

In an example, the pre-integration simulation function included in the pre-integration simulation module is used to simulate a pre-integration map in FIG. 5. In this way, the first rendering color of the target pixel point may be determined through the pre-integration simulation function included in the pre-integration simulation module. The input parameters of the pre-integration simulation function include the pre-integration color bright parameter, the pre-integration color dark parameter, the pre-integration range parameter, the terminator position parameter (the terminator position parameter may represent a terminator position), the normal direction parameter, and the light source direction parameter. The light source direction parameter is used for representing the light source direction of the preset light source used during rendering of the to-be-rendered object.

Through the pre-integration simulation function, the first rendering color of the target pixel point of the to-be-rendered object can be rendered by simulating the pre-integration map according to the pre-integration color bright parameter, the pre-integration color dark parameter, the pre-integration range parameter, and the terminator position parameter, the normal direction parameter, and the light source direction parameter.

The pre-integration range parameter is used for representing the first integration range and the second integration range, the pre-integration color bright parameter is used for representing the first color (color bright) in the first integration range, the pre-integration color dark parameter is used for representing the second color (color dark) in the second integration range, and the first color is brighter than the second color.

In this embodiment, the first rendering color of the target pixel point is determined through the pre-integration color bright parameter, the pre-integration color dark parameter, the pre-integration range parameter, and the terminator position parameter, the normal direction parameter, and the light source direction parameter, thereby avoiding obtaining position information of the target pixel point, and saving the expenditure.

In some embodiments, a second matte parameter is determined according to the normal direction parameter and a second line-of-sight direction parameter, the second line-of-sight direction parameter being used for representing a direction from a virtual camera used during rendering of the to-be-rendered object to the target pixel point. A third rendering color of the target pixel point is determined according to a preset ambient light parameter and the second matte parameter. The determining the target rendering color of the target pixel point according to the first rendering color includes: determining the target rendering color of the target pixel point according to the first rendering color and the third rendering color.

In some embodiments, the second matte parameter may be understood as a Fresnel matte parameter. When the surface normal of an object (for example, the to-be-rendered object) is more directly facing a line of sight, a grayscale value of the Fresnel matte parameter is lower, and when the normal of the object is more perpendicular to the line of sight, a grayscale value of the Fresnel matte parameter is higher. In the real world, except for metal, all substances have different degrees of "Fresnel effect". When a line of sight is perpendicular to an object surface, the reflection is weaker. When the line of sight is not perpendicular to the object surface, a smaller angle indicates stronger reflection. For example, when a ball is observed, the reflection of the ball center is weaker, and the reflection near the edge is stronger.

The second matte parameter may be determined according to the normal direction parameter and the second line-of-sight direction parameter. The line-of-sight direction parameter may be understood as a line-of-sight direction corresponding to the target pixel point. The second line-of-sight direction parameter is used for representing the direction from the virtual camera to the target pixel point. The virtual camera may be understood as a virtual camera in the game technology, and can be used for rendering pictures in the game.

Then, the third rendering color of the target pixel point is determined according to the preset ambient light parameter and the second matte parameter. Finally, the target rendering color of the target pixel point is determined according to both the first rendering color and the third rendering color. The ambient light parameter may be a preset value and vary according to scenario and normal. With the normal moving upward or downward, the value of the ambient light parameter varies gradually. The ambient light parameter may be obtained through a corresponding ambient matte map. The ambient matte map may be used for shading some ambient light, and also providing some scattering light and other non-direct light with some shading effects, so that the rendering effect more realistically reflects the physical effect.

It may be understood that the foregoing is merely an example, which is not limited herein.

In this embodiment, by determining the target rendering color of the target pixel point according to both the first rendering color and the third rendering color, a color of the target pixel point can be rendered more realistically, and the physical effect of the to-be-rendered object can further be rendered more realistically, thereby reducing the plastic feeling of the to-be-rendered object, and improving the reality of the to-be-rendered object.

In some embodiments, the determining a second matte parameter according to the normal direction parameter and a second line-of-sight direction parameter may include: performing a dot product on the normal direction parameter and the second line-of-sight direction parameter, and determining a result of the dot product as the second matte parameter.

In some embodiments, the second line-of-sight direction may be understood as the direction from the virtual camera in a game to the target pixel point. The second matte parameter may be obtained by performing a dot product on the normal direction parameter and the line-of-sight direction parameter.

In some embodiments, the determining a third rendering color of the target pixel point according to a preset ambient light parameter and the second matte parameter may include: calculating a product of the ambient light parameter and the second matte parameter, and determining the third rendering color of the target pixel point according to the product. Specifically, the value of the third rendering color of the target pixel point is determined according to the product.

In some embodiments, the product of the ambient light parameter and the second matte parameter may be determined as the third rendering color.

In some embodiments, a target grayscale value of a diffuse reflection component of the target pixel point in the diffuse map is obtained. A third matte parameter is determined according to an ambient occlusion (AO) color value and an AO grayscale value that correspond to the target pixel point and the target grayscale value. A highlight parameter is determined according to the third matte parameter, a roughness parameter, the normal direction parameter, a light source direction parameter, and the second line-of-sight direction parameter. The light source direction parameter is used for representing a light source direction of a preset light source used during rendering of the to-be-rendered object, and the roughness parameter is a parameter outputted through a preset channel of the diffuse map. The determining the target rendering color of the target pixel point according to the first rendering color and the third rendering color includes: determining the target rendering color of the target pixel point according to the first rendering color, the third rendering color, and the highlight parameter.

In some embodiments, the third matte parameter may be determined according to the AO color value and the AO grayscale value that correspond to the target pixel point and the target grayscale value. Then, the highlight parameter may be determined according to the third matte parameter, the roughness parameter, the normal direction parameter, the light source direction parameter, and the second line-of-sight direction parameter, the light source direction parameter being used for representing the light source direction of the preset light source used during rendering of the to-be-rendered object, and the roughness parameter being a parameter outputted through the preset channel of the diffuse map.

Ambient occlusion (AO) indicates an effect that when an object overlaps or is close to another object, surrounding diffuse light is occluded, which can resolve or alleviate problems of light leakage, floating, false shadow, and unclear presentation of a gap, a fold, a corner, an angular line, a tiny object, and the like in a scene, comprehensively improve details especially shadow in the dark, improve the sense of depth and reality of a space, and strengthen and improve the chiaroscuro of an image, thereby enhancing the artistry of the image. Intuitive feeling of a player brought by the AO effect is mainly embodied in the luminosity of an image. Light in an image with AO-off is slightly brighter. After the AO effect is switched on, partial details especially shadow in the dark of the image is more conspicuous.

In some embodiments, the target rendering color of the target pixel point may be determined according to the first rendering color, the third rendering color, and the highlight parameter.

In some embodiments, the determining the third matte parameter according to an AO color value and an AO grayscale value that correspond to the target pixel point and the target grayscale value may include: calculating the third matte parameter lerp based on a matte parameter calculation formula, the matte parameter calculation formula being lerp=a*(1−x)+b*x, where a represents the AO color value, b represents the target grayscale value, and x represents the AO grayscale value.

In some embodiments, the determining the third matte parameter according to an AO color value and an AO grayscale value that correspond to the target pixel point and the target grayscale value may be performed through the following formula. For example, the third matte parameter is marked as lerp, where lerp=a*(1−x)+b*x, where a represents the AO color value, b represents the target grayscale value, and x represents the AO grayscale value.

In some embodiments, the determining the target rendering color of the target pixel point according to the first rendering color, the third rendering color, and the highlight parameter includes: determining a sum of a value of the first rendering color, a value of the third rendering color, and a value of the highlight parameter, and determining the target rendering color according to the sum. Specifically, the value of the target rendering color is determined according to the sum.

In some embodiments, the sum of the value of the first rendering color, the value of the third rendering color, and the value of the highlight parameter is determined as the target rendering color of the target pixel point.

In some embodiments, a backlighting color of the target pixel point is determined according to the normal direction parameter, the light source direction parameter, a first line-of-sight direction parameter, and a subsurface transparency parameter, the subsurface transparency parameter being a parameter outputted through a preset channel of the normal map, and the first line-of-sight direction parameter being used for representing a direction from the target pixel point to the virtual camera; a second rendering color of the target pixel point is determined according to the backlighting color and a first matte parameter, the first matte parameter being corresponded to a distance between the target pixel point and a central axis of the to-be-rendered object; and the determining the target rendering color of the target pixel point according to the first rendering color, the third rendering color, and the highlight parameter includes: determining the target rendering color of the target pixel point according to the first rendering color, the second rendering color, the third rendering color, and the highlight parameter.

In some embodiments, the backlighting color of the target pixel point may alternatively be determined according to the normal direction parameter, the light source direction parameter, the first line-of-sight direction parameter, and the subsurface transparency parameter, the subsurface transparency parameter being a parameter outputted through the preset channel of the normal map, and the first line-of-sight direction parameter being used for representing the direction from the target pixel point to the virtual camera. The backlighting color can express a natural feature that ears, nose, and the like glow in a backlighting condition.

Then, the second rendering color of the target pixel point is determined according to the backlighting color and the first matte parameter, the first matte parameter being corresponded to the distance between the target pixel point and the central axis of the to-be-rendered object, and then, the target rendering color of the target pixel point is determined according to the first rendering color, the second rendering color, the third rendering color, and the highlight parameter.

The first matte parameter may be understood as a subsurface transparency matte parameter. The subsurface transparency matte may be a matte which becomes darker when getting closer to the central axis of the to-be-rendered object (for example, a human face). The subsurface transparency matte parameter may be stored in advance in the terminal device. During rendering, there is no need to calculate the subsurface transparency matte parameter temporarily. It may be understood that the foregoing is merely an example, which is not limited herein.

In this embodiment, the backlighting color can simulate a backlighting color of the target pixel point in a backlighting condition, so that the rendering effect of the target pixel point is more realistically reflected. Storing the subsurface transparency matte parameter in advance can reduce the expenditure of real-time calculation, thereby saving the expenditure, and improving the efficiency.

In some embodiments, before the second rendering color of the target pixel point is determined according to the backlighting color and the first matte parameter, a normal length L of a target axis corresponding to the target pixel point is obtained; and the first matte parameter is determined as 1-L.

In some embodiments, using an example in which the to-be-rendered object is a human face, the target axis corresponding to the human face may be understood as the Z axis or the Y axis in the world space coordinate system. The normal length may be marked as L. When the target pixel point is closer to the central axis, L is closer to 1. In an actual calculating process, the value of the normal length may be 1.

It may be understood that the foregoing is merely an example, and this embodiment is not limited thereto.

In some embodiments, the determining a second rendering color of the target pixel point according to the backlighting color and a first matte parameter may include: calculating a product of a value of the backlighting color and the first matte parameter, and determining the second rendering color according to the product. Specifically, the value of the second rendering color is determined according to the product.

In some embodiments, for the determining a second rendering color of the target pixel point according to the backlighting color and a first matte parameter, the product of the value of the backlighting color and the first matte parameter may be determined as the value of the second rendering color.

The natural feature that the ears, the nose, and the like flush in a backlighting condition can be simulated through the backlighting color, so that the ears of a character with the back to a light source (for example, the sun) appear translucent.

In this embodiment, the value of the backlighting color is multiplied by the first matte parameter to obtain the second rendering color, which can more realistically simulate the rendering effect in a backlighting condition, thereby improving the reality of the rendering effect.

In some embodiments, before the first rendering color of the target pixel point is determined, the method further includes: obtaining a first value of an R component of the target pixel point in the normal map and a second value of a G component in the normal map; determining a third value of a B component of the target pixel point in the normal map according to the first value and the second value; and determining the normal direction parameter according to the first value, the second value, and the third value.

In some embodiments, when the normal map of the to-be-rendered object is stored, only maps of two components of the normal map may be stored, and then, a map of the third component of the normal map may be calculated through the Pythagorean theorem. The normal map includes three components—the X axis, the Y axis, and the Z axis in the world space coordinate system. As shown in FIG. 4, the R channel (functioned as the R component) corresponds to the X axis direction of the normal, and the G channel (functioned as the G component) corresponds to the Y axis direction of the normal.

Then, the first value of the R component of the target pixel point in the normal map and the second value of the G component in the normal map are obtained, the third value of the B component of the target pixel point in the normal map is determined according to the first value and the second value, and finally, the normal direction parameter is determined according to the first value, the second value, the third value, and the third matte parameter.

In some embodiments, the determining a third value of a B component of the target pixel point in the normal map according to the first value and the second value includes: determining the third value of the B component of the target pixel point in the normal map based on a value calculation formula, the value calculation formula being sqrt(1−dot(rg, rg)), where dot(rg, rg)=r*r+g*g, sqrt(x)=$\sqrt{x}$; and r represents the first value, and g represents the second value.

In some embodiments, the determining a third value of a B component of the target pixel point in the normal map according to the first value and the second value may be determining the third value as sqrt(1−dot(rg, rg)), where dot(rg, rg)=r*r+g*g, sqrt(x)=$\sqrt{t}$; and r represents the first value, and g represents the second value. For example, assuming that the R component is r, the G component is g, and the B component is b, $b = 1 - \sqrt{r^2 + g^2}$.

In this embodiment, the third value of the B component is determined according to the first value of the R component and the second value of the G component, so that storage of the value of the B component can be avoided, thereby saving the expenditure of storing the B component, and improving the efficiency.

Figure 6:
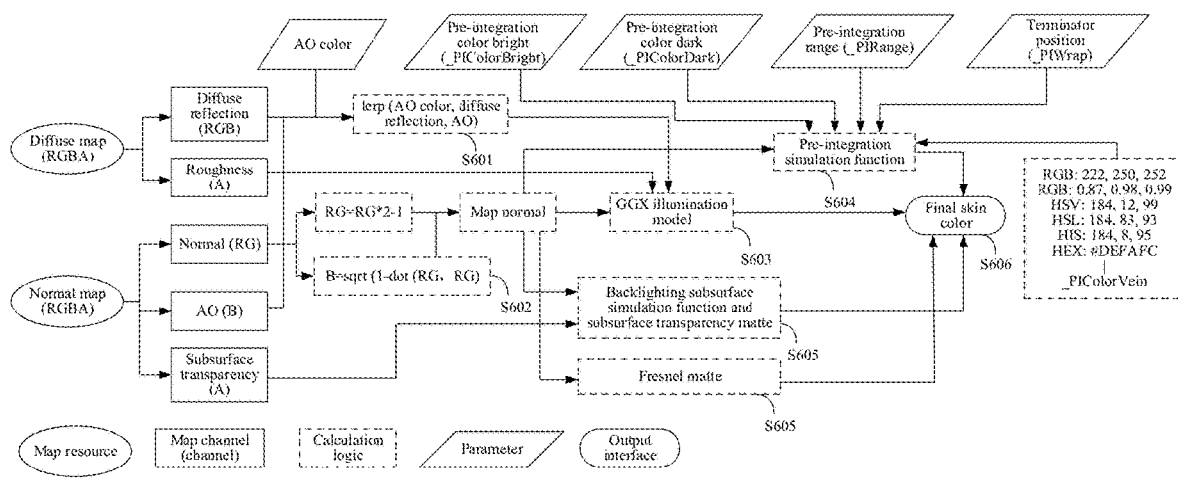
FIG. 6 is a schematic diagram of a logical relationship of an object rendering process according to an embodiment of this application.

The following describes a process of the object rendering method with reference to examples. As shown in FIG. 6, the method includes the following steps.

In one embodiment, an engine corresponding to the to-be-rendered object may be used to render the to-be-rendered object. The engine includes a virtual camera and a preset light source simulating parallel light. The virtual camera may be understood as a virtual camera in the game technology, and can be used for rendering pictures in the game.

In this embodiment, the stored normal map may only include two components, for example, the X component and the Y component of the normal which correspond to R and G components of the normal map. Then, the third component is calculated by using a subshader through the Pythagorean theorem, thereby saving a channel.

FIG. 3 is the diffuse map of the to-be-rendered object. To save resources, a roughness map may be put into an A channel.

FIG. 4 is the normal map of the to-be-rendered object. R, G, B, and A channels represent the X direction of the normal, the Y direction of the normal, an ambient matte, and light transmittance respectively. R and G are the X direction and the Y direction of the normal, which represent the curve of skin details. Mapping can express more details than merely modeling.

The following process may correspond to any target pixel point of the to-be-rendered object.

S601: Determine the third matte parameter.

As shown in FIG. 6, the diffuse map and the normal map of the to-be-rendered object are obtained, an AO color parameter is inputted, the AO color parameter including the AO color value, the AO grayscale value, and the target grayscale value, and the third matte parameter is determined, which may be calculated according to the following formula. For example, the third matte parameter is marked as lerp, where lerp=a*(1−x)+b*x. A gray AO map may be transformed into a colored AO map on which the diffuse map is overlaid, so that ambient occlusion that skin glows after being penetrated by light can be simulated.

S602: Obtain the first value of the R component of the target pixel point in the normal map and the second value of the G component in the normal map, and determine the third value of the B component of the target pixel point in the normal map according to the first value and the second value, which may be determining the third value as sqrt(1−dot(rg, rg)), where dot(rg, rg)=r*r+g*g, sqrt(x)=$\sqrt{x}$; and r represents the first value, and g represents the second value. For example, assuming that the R component is r, the G component is g, and the B component is b, $b = 1 - \sqrt{r^2 + g^2}$.

S603: Input the obtained third matte parameter lerp, the first value of the R component of the target pixel point, the second value of the G component of the target pixel point, and the third value of the B component of the target pixel point into a GGX illumination model to obtain the highlight parameter.

The GGX illumination model may be calculated according to the following process:

First, the normal direction parameter (marked as normal) is determined in a map normal module through matrix transformation according to the first value of the R component of the target pixel point, the second value of the G component of the target pixel point, and the third value of the B component of the target pixel point.

Then, parameters inputted into the GGX illumination model include: the third matte parameter lerp outputted in S601, the roughness parameter (marked as roughness) outputted through the A channel in the diffuse map, and the normal direction parameter (marked as normal) outputted by the map normal module.

In addition, the GGX illumination model may further use the following parameters: the light source direction parameter (marked as LightDir) and the second line-of-sight direction parameter (marked as viewDir). The light source direction parameter is used for representing a light source direction of a preset light source used during rendering of the to-be-rendered object and may be automatically calculated and transmitted to the GGX illumination model through the engine for rendering the target pixel point. The second line-of-sight direction parameter is used for representing a direction from the virtual camera to the target pixel point. The second line-of-sight direction parameter may be automatically calculated and transmitted to the GGX illumination model through the engine for rendering the target pixel point.

In one example, a result outputted by the GGX illumination model may include, but is not limited to, the highlight parameter. The highlight parameter=D*F*V, D being a normal distribution map, F being a Fresnel factor, and V being a visible light factor.

In one example, D, F, and V may be calculated through the following steps:

$rou^2$=roughness*roughness(the square of the roughness);

$rou^4$=$rou^2$*$rou^2$(the fourth power of the roughness);

$H$=normalize(viewDir+LightDir), where $H$ is a semi-vector, and "normalize" is a normalization function;

dot$NL$=saturate(dot(normal,LightDir));

dot$NV$=saturate(dot(normal,viewDir));

dot$NH$=saturate(dot(normal,$H$));

$d$=dot$NH$*dot$NH$*($rou^4$−1)+1);

$D$=$rou^4$/(π*$d$*$d$);

$F$=$F0$+(1−$F0$)*pow(1−saturate(dot(LightDir,$H$)),5);

$$V = \frac{1}{dotNV*(1-rou^2/2)+rou^2/2} * \frac{1}{dotNL*(1-rou^2/2)+rou^2/2} * dotNL,$$

where $F_0$ is a highlight color, a physical constant defined by the engine, and usually in a range of 0.02-0.05, pow(x,y)=$x^y$, saturate(X) is a limiting function of 0-1, and "dot" is a vector dot product;

Finally, D, F, and V that are obtained in the foregoing process may be inputted into the formula: highlight parameter=D*F*V, to obtain the highlight parameter (functioned as the foregoing illumination parameter), and the highlight parameter is used as the output of the GGX model.

All constants used in the calculation process are examples and may vary from scenario to scenario. For example, the constant used in the foregoing calculation of F is 5, or may be another value, which is not detailed in this embodiment.

S604: In the pre-integration simulation function, the inputted parameters include: the pre-integration color bright parameter_PIColorBright, the pre-integration color dark parameter_PIColorDark, the pre-integration range parameter_PIRange, terminator position parameter_PIWrap (or referred to as terminator offset parameter), and the normal direction parameter (marked as normal) outputted by the map normal module.

In one example, the pre-integration simulation function may further use the following parameter: the light source direction parameter (marked as LightDir). The light source direction parameter is used for representing the light source direction of the preset light source used during rendering of the to-be-rendered object and may be automatically calculated and transmitted to the pre-integration simulation function through the engine for rendering the target pixel point.

In one example, the pre-integration simulation function may further use the following parameter: _PIColorVein. As shown in FIG. 6, _PIColorVein represents a color constant of light transmittance of a vein surface of a human body.

The first rendering color of the target pixel point is obtained through the pre-integration simulation function. The pre-integration simulation function in FIG. 6 may be:

preintegratedFun (normal, LightDir, _PIColorDark, _PIColorBright, _PIWrap, and PIRange).

The foregoing preintegratedFunc is a pre-integration simulation function. The first rendering color can be outputted through the function preintegratedFunc.

The following specifically describes a calculation process of the pre-integration simulation function.

ndl=dot(normal, LightDir), where ndl is a light-receiving factor, used for expressing a relationship between a model surface direction and a light source direction;

ndlwrap=(ndl+_PIWrap)/(1+_PIWrap), where ndlwrap is a warped light-receiving factor, used for moving the terminator position;

saturatedNDLwrap=saturate(ndlwrap)*shadow, where saturate(X) is a limiting function of 0-1, shadow is a parameter that is provided by the engine for rendering the target pixel point and used for determining whether in shadow, 0 means in shadow, and 1 means in non-shadow;

shadowcolor=_PIColorDark.rgb*_PIColorDarka, and the expression is obtaining a color dark defined by a user through inputted parameters, where the pre-integration color dark parameter (_PIColorDark) is a four-dimensional vector, PIColorDark.rgb represents the first three components of the vector _PIColorDark, and PIColorDark.a represents the last component of the vector _PIColorDark.

Diffuse reflection part=lerp(shadowcolor, _PIcolorvein, saturatedNdlwrap), where _PIColorVein represents a color constant of light transmittance of a vein surface of a human body. The value of _PIColorVein may refer to the value in FIG. 6, for example, the value may be 0.87, 0.98, and 0.99. lerp herein represents a function name. The value of _PIColorVein in FIG. 6 is merely an example and may vary from scenario to scenario.

e1=saturate((ndlwrap−_PIRange*0.5)/_PIRange, where e1 is one of factors of the function smoothstep;

e2=saturate((ndlwrap−_PIRange*2)/−_PIRange), where e2 is one of factors of the function smoothstep;

scattering part=e1*e1*(3−2*e1)*e2*e2*(3−2*e2); and outputted color=diffuse reflection part+scattering part*_PIColorBright.rgb*_PIColorBright.a*shadow.

The outputted color is the first rendering color of the target pixel point. The pre-integration color bright parameter_PIColorBright is a four-dimensional vector, PIColorBright.rgb represents the first three components of the vector _PIColorBright, and _PIColorBright.a represents the last component of the vector _PIColorBright.

All constants used in the calculation process are examples and may vary from scenario to scenario. For example, the constant used in the foregoing calculation of F is 0.5, or may be another value, which is not detailed in this embodiment.

S605: Obtain the backlighting color through a backlighting subsurface simulation function, and determine a product of the value of the backlighting color and the subsurface transparency matte parameter as the second rendering color.

In one example, input parameters of the backlighting subsurface simulation function include the normal direction parameter (marked as normal) outputted by the map normal module in FIG. 6. A subsurface transparency parameter thickness outputted by the A channel of the normal map is used for representing the subsurface transparency.

In addition, the backlighting subsurface simulation function may further use the following parameter: the light source direction parameter (marked as LightDir), where the light source direction parameter is used for representing the light source direction of the preset light source used during rendering of the to-be-rendered object, and may be automatically calculated and transmitted to the backlighting subsurface simulation function through the engine for rendering the target pixel point; and a line-of-sight direction parameter (marked as vEye), where vEye is used for representing a direction from the target pixel point to the virtual camera (an opposite direction of the viewDir), and the line-of-sight direction parameter vEye may be automatically calculated and transmitted to the backlighting subsurface simulation function through the engine for rendering the target pixel point.

In one example, a calculation process of the backlighting subsurface simulation function is as follows:

vLTLight=LightDir+normal*0.2, where 0.2 is merely an example, and the value range herein may be [0,1];

fLTDot=saturate(dot(vEye, −vLTLight))*0.75+0.25, where 0.75 and 0.25 are merely examples, and the two values may be positive decimals that are added to get 1 (for example, 0.8 and 0.2);

fLT=fLTDot*thickness; and finally, through the backlighting color of the target pixel point outputted by a backlighting subsurface simulation module, BackLighting=_BackSSSColor.rgb*_BackSSSColor.a*fLT*10.0, where _BackSSSColor represents the backlighting subsurface scattering color, _BackSSSColor is a four-dimensional vector, _BackSSSColor.rgb represents the first three components of _BackSSSColor, and _BackSSSColor.a represents the last component of _BackSSSColor. _BackSSSColor may be a color parameter inputted by a user, and may be automatically transmitted through the engine for rendering the target pixel point to the backlighting subsurface simulation module.

In one example, the second rendering color=backlighting color*first matte parameter. The first matte parameter may be determined as 1−L. The first matte parameter may be understood as a subsurface transparency matte parameter and may be marked as sssMask=1−L. In some embodiments, the subsurface transparency matte parameter is used for representing a matte which becomes darker when getting closer to the central axis of a human face. The normal length of the Z/Y axes corresponding to the human face of a model in an object space is preset as L. When the target pixel point is closer to the central axis, L is closer to 1.

All constants used in the calculation process are examples and may vary from scenario to scenario. For example, the constant used in the foregoing calculation of F is 0.2, or may be another value, which is not detailed in this embodiment.

In one example, the third rendering color is determined according to a product of a Fresnel matte parameter and an ambient light parameter, which is specifically as below:

The Fresnel matte parameter=dot(viewDir, normal). The Fresnel matte parameter corresponds to the second matte parameter. The line-of-sight direction parameter (marked as viewDir) is used for representing the direction from the virtual camera to the target pixel point. The line-of-sight direction parameter may be automatically calculated and transmitted to a Fresnel matte module through the engine for rendering the target pixel point.

The third rendering color=Fresnel matte parameter*ambient light parameter. The ambient light parameter may be a preset value and vary according to scenario and normal. With the normal moving upward or downward, the value of the ambient light parameter varies gradually.

S606. Add the first rendering color, the second rendering color, the third rendering color, and the highlight parameter together to obtain a final color of the target pixel point, which is specifically as below:

In a possible embodiment, the final color=first rendering color+second rendering color+third rendering color+highlight parameter.

It may be understood that the foregoing is merely an example, and this embodiment is not limited thereto.

In a possible embodiment, FIG. 6 merely shows an example. The final color may alternatively be the final color=first rendering color+third rendering color+highlight parameter.

Figure 7:
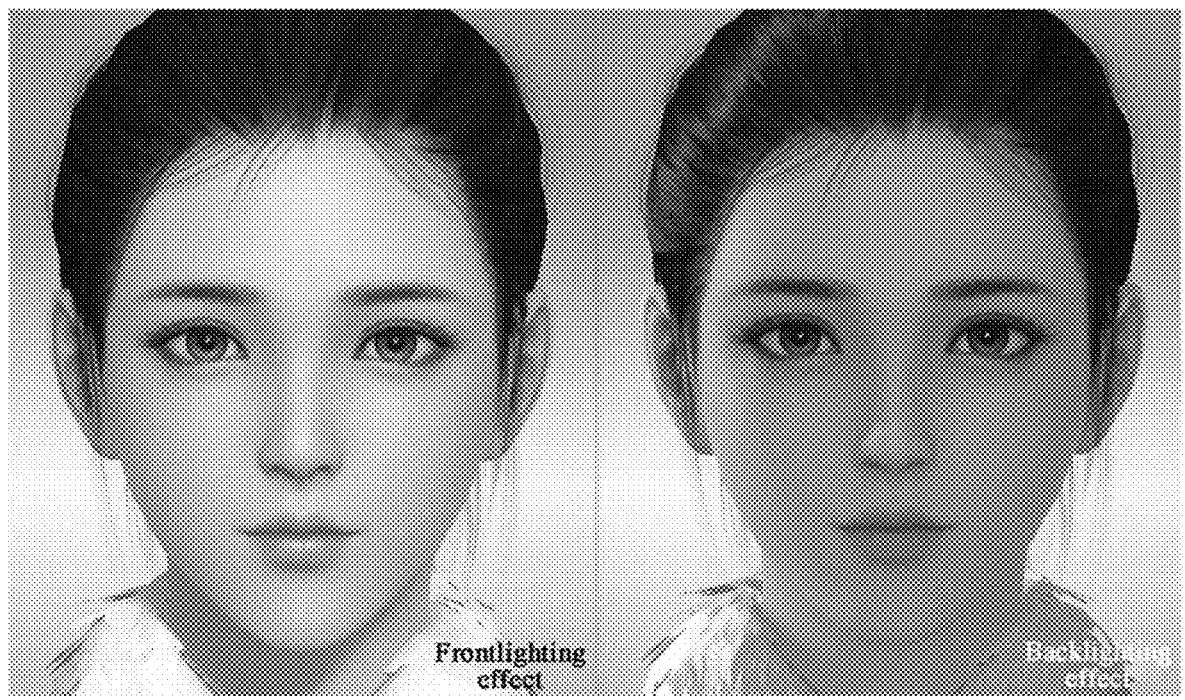
FIG. 7 is a schematic diagram of a rendering effect according to an embodiment of this application.

As shown in FIG. 7, different rendering effects of skin of a female character in a game in a front lighting condition and backlighting condition may be simulated. FIG. 7 is a grayscale picture and cannot represent a realistic effect picture. In the realistic effect picture, a player may feel that the female skin is more translucent, and especially in a backlighting case, the ears glow more conspicuously. By using the foregoing solution, skin can be rendered more realistically, the scattering effect can be more comprehensive, and a great parameterization effect can be provided. The solution is applicable to different skin types, and applicable to both male characters and female characters in a game, so that characters in the game can be more lifelike.

Figure 8:
FIG. 8 is a schematic diagram of a rendering effect according to an embodiment of this application.

FIG. 8 is a grayscale picture and cannot represent a realistic effect picture. In the realistic effect picture, a rendering effect picture in different illumination angle conditions is actually presented. In an implementation, when light shines from the front, only the cheeks and the edge of wing of the nose glow slightly, and when light shines from sides, more glows appear on the nose and the part neighboring lips. When light shines from the half side back, only the part neighboring the terminator is reddish. In a totally backlighting condition, the front of the human face does not glow, and only the part surrounding ears glows. In this method, a realistic physical phenomenon can be naturally shown, thereby improving the rendering effect.

In this embodiment, the natural feature that the ears and the nose glow in a backlighting condition is specially expressed through the backlighting subsurface scattering simulation function. When a line of sight faces toward a light source, transmitted light is brighter. Then, a Fresnel matte is used for obscuring, which can filter extremely thick parts that are difficultly to be transmitted in a human body, and the obscuring is performed again through a subsurface transparency map, thereby achieving an exquisite subsurface scattering change effect, and improving the effect of rendering.

FIG. 2 and FIG. 6 are schematic flowcharts of an optional object rendering method in an embodiment. It is to be understood that although each step of the flowcharts in FIG. 2 and FIG. 6 is shown sequentially according to arrows, the steps are not necessarily performed according to an order indicated by arrows. Unless explicitly specified in this application, execution of the steps is not strictly limited, and the steps may be performed in other sequences. In addition, at least some steps in FIG. 2 and FIG. 6 may include a plurality of substeps or a plurality of stages. The substeps or the stages are not necessarily performed at the same instance, and instead may be performed at different instances. A performing sequence of the substeps or the stages is not necessarily performed in sequence, and instead may be performed in turn or alternately with another step or at least some of substeps or stages of another step.

To make the description simple, the foregoing method embodiments are stated as a series of action combinations. However, a person skilled in the art needs to know that this application is not limited to the described sequence of the actions because according to this application, some steps may use another sequence or may be simultaneously performed. In addition, a person skilled in the art shall also know that all the embodiments described in the specification are exemplary embodiments, and the related actions and modules are not necessarily mandatory to embodiments of this application.

Figure 9:
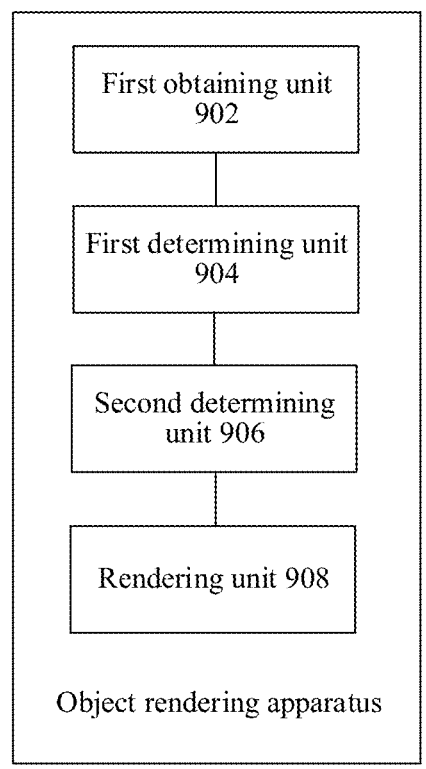
FIG. 9 is a schematic structural diagram of an object rendering apparatus according to an embodiment of this application.

According to another aspect of the embodiments of this application, an object rendering apparatus is further provided. As shown in FIG. 9, the apparatus includes:

(1) a first obtaining unit 902, configured to obtain a target pixel point to be processed in a diffuse map and a normal map of a to-be-rendered object;

(2) a first determining unit 904, configured to determine a first rendering color of the target pixel point according to a pre-integration simulation module and a normal direction parameter corresponding to the target pixel point, the pre-integration simulation module being configured to simulate a pre-integration map, the pre-integration map being used for representing a correspondence between curvature and a color band, the normal direction parameter being used for representing a normal direction of the target pixel point in a world space coordinate system;

(3) a second determining unit 906, configured to determine a target rendering color of the target pixel point according to the first rendering color; and (4) a rendering unit 908, configured to render the target pixel point by using the target rendering color.

In some embodiments, the first obtaining unit 902 may be configured to perform S202, the first determining unit 904 may be configured to perform S204, the second determining unit 906 may be configured to perform S206, and the rendering unit 908 may be configured to perform S208.

In this embodiment, first, a target pixel point to be processed in a diffuse map and a normal map of a to-be-rendered object is obtained. Then, a first rendering color of the target pixel point is determined according to a pre-integration simulation module and a normal direction parameter corresponding to the target pixel point. The pre-integration simulation module is configured to simulate a pre-integration map, the pre-integration map being used for representing a correspondence between curvature and a color band, and the normal direction parameter is used for representing a normal direction of the target pixel point in a world space coordinate system. Next, a target rendering color of the target pixel point is determined according to the first rendering color, and finally, the target pixel point is rendered by using the target rendering color. Through the foregoing technical solution, calculation of a corresponding position of a target pixel point on a map can be avoided, thereby saving the expenditure, and improving the efficiency of rendering a to-be-rendered object.

In one embodiment, the first determining unit is further configured to determine the first rendering color of the target pixel point according to a pre-integration color bright parameter, a pre-integration color dark parameter, a pre-integration range parameter, a terminator position parameter, the normal direction parameter, and a light source direction parameter, the light source direction parameter being used for representing a light source direction of a preset light source used during rendering of the to-be-rendered object, input parameters of a pre-integration simulation function included in the pre-integration simulation module including the pre-integration color bright parameter, the pre-integration color dark parameter, the pre-integration range parameter, and the terminator position parameter, and the pre-integration simulation function being used for simulating the pre-integration map according to the pre-integration color bright parameter, the pre-integration color dark parameter, the pre-integration range parameter, and the terminator position parameter.

The pre-integration range parameter is used for representing a first integration range and a second integration range, the pre-integration color bright parameter is used for representing a first color in the first integration range, the pre-integration color dark parameter is used for representing a second color in the second integration range, the first color is brighter than the second color, and the terminator position parameter is used for representing a terminator position.

In one embodiment, the apparatus further includes:

(1) a third determining unit, configured to determine a second matte parameter according to the normal direction parameter and a second line-of-sight direction parameter, the second line-of-sight direction parameter being used for representing a direction from a virtual camera used during rendering of the to-be-rendered object to the target pixel point; and determine a third rendering color of the target pixel point according to a preset ambient light parameter and the second matte parameter; and (2) the second determining unit being further configured to determine the target rendering color of the target pixel point according to the first rendering color and the third rendering color.

In one embodiment, the third determining unit is further configured to perform a dot product on the normal direction parameter and the second line-of-sight direction parameter, and determine a result of the dot product as the second matte parameter.

In one embodiment, the third determining unit is further configured to calculate a product of the ambient light parameter and the second matte parameter, and determine the third rendering color of the target pixel point according to the product. Specifically, the value of the third rendering color of the target pixel point is determined according to the product.

In one embodiment, the apparatus further includes:

(1) a fourth determining unit, configured to obtain a target grayscale value of a diffuse reflection component of the target pixel point in the diffuse map; determine a third matte parameter according to an AO color value and an AO grayscale value that correspond to the target pixel point and the target grayscale value; and determine a highlight parameter according to the third matte parameter, a roughness parameter, the normal direction parameter, a light source direction parameter, and the second line-of-sight direction parameter, the light source direction parameter being used for representing a light source direction of a preset light source used during rendering of the to-be-rendered object, and the roughness parameter being a parameter outputted through a preset channel of the diffuse map; and (2) the second determining unit being further configured to determine the target rendering color of the target pixel point according to the first rendering color, the third rendering color, and the highlight parameter.

In one embodiment, the fourth determining unit is further configured to calculate the third matte parameter lerp based on a matte parameter calculation formula, the matte parameter calculation formula being lerp=a*(1−x)+b*x, where a represents the AO color value, b represents the target grayscale value, and x represents the AO grayscale value.

In one embodiment, the second determining unit is further configured to determine a sum of a value of the first rendering color, a value of the third rendering color, and a value of the highlight parameter, and determine the target rendering color of the target pixel point according to the sum. Specifically, the value of the target rendering color is determined according to the sum.

In one embodiment, (1) the fourth determining unit is further configured to determine a backlighting color of the target pixel point according to the normal direction parameter, the light source direction parameter, a first line-of-sight direction parameter, and a subsurface transparency parameter, the subsurface transparency parameter being a parameter outputted through a preset channel of the normal map, and the first line-of-sight direction parameter being used for representing a direction from the target pixel point to the virtual camera; and determine a second rendering color of the target pixel point according to the backlighting color and a first matte parameter, the first matte parameter being corresponded to a distance between the target pixel point and a central axis of the to-be-rendered object; and (2) the second determining unit being further configured to determine the target rendering color of the target pixel point according to the first rendering color, the second rendering color, the third rendering color, and the highlight parameter.

In one embodiment, the apparatus further includes:

(1) a second obtaining unit, configured to obtain, before the second rendering color of the target pixel point is determined according to the backlighting color and the first matte parameter, a normal length L of a target axis corresponding to the target pixel point; and (2) a fifth determining unit, configured to determine the first matte parameter as 1−L.

In one embodiment, the fourth determining unit is further configured to calculate a product of a value of the backlighting color and the first matte parameter, and determine the second rendering color according to the product.

In one embodiment, the second determining unit is further configured to determine a sum of a value of the first rendering color, a value of the second rendering color, a value of the third rendering color, and a value of the highlight parameter, and determine the target rendering color of the target pixel point according to the sum. Specifically, the value of the target rendering color is determined according to the sum.

In one embodiment, the apparatus further includes:

(1) a third obtaining unit, configured to obtain a first value of an R component of the target pixel point in the normal map and a second value of a G component in the normal map;

(2) a sixth determining unit, configured to obtain a third value of a B component of the target pixel point in the normal map according to the first value and the second value; and (3) a seventh determining unit, configured to determine the normal direction parameter according to the first value, the second value, and the third value.

In one embodiment, the seventh determining unit is further configured to determine the third value of the B component of the target pixel point in the normal map based on a value calculation formula, the value calculation formula being sqrt(1−dot(rg, rg)), where dot(rg, rg)=r*r+g*g, sqrt(x)=√x; and r represents the first value, and g represents the second value.

According to still another aspect of the embodiments of this application, a storage medium is further provided. The storage medium stores a computer program, the computer program, when run, being configured to perform the steps in any one of the foregoing method embodiments.

In some embodiments, the storage medium may be configured to store a computer program for performing the following steps:

S1: Obtain a target pixel point to be processed in a diffuse map and a normal map of a to-be-rendered object.

S2: Determine a first rendering color of the target pixel point according to a pre-integration simulation module and a normal direction parameter corresponding to the target pixel point, the pre-integration simulation module being configured to simulate a pre-integration map, the pre-integration map being used for representing a correspondence between curvature and a color band, and the normal direction parameter being used for representing a normal direction of the target pixel point in a world space coordinate system.

S3: Determine a target rendering color of the target pixel point according to the first rendering color.

S4: Render the target pixel point by using the target rendering color.

In some embodiments, the storage medium may be configured to store the computer program for executing the following steps:

In some embodiments, a person of ordinary skill in the art can understand that all or some of the steps of the methods in the foregoing embodiments can be implemented by a program instructing relevant hardware of a terminal device. The program may be stored in a computer-readable storage medium, and the storage medium may include a flash drive, a read-only memory (ROM), a random access memory (RAM), a magnetic disk, an optical disc, and the like.

According to yet another aspect of the embodiments of this application, an electronic device for implementing the above object rendering method is further provided. As shown in FIG. 9, the electronic device includes a memory 902 and a processor 904. The memory 902 stores a computer program, and the processor 904 is configured to perform the steps in any one of the above method embodiments through the computer program.

In some embodiments, the electronic device may be located in at least one of a plurality of network devices in a computer network.

In some embodiments, the processor may be configured to perform the following steps through the computer program:

S1: Obtain a target pixel point to be processed in a diffuse map and a normal map of a to-be-rendered object.

S2: Determine a first rendering color of the target pixel point according to a pre-integration simulation module and a normal direction parameter corresponding to the target pixel point, the pre-integration simulation module being configured to simulate a pre-integration map, the pre-integration map being used for representing a correspondence between curvature and a color band, and the normal direction parameter being used for representing a normal direction of the target pixel point in a world space coordinate system.

S3: Determine a target rendering color of the target pixel point according to the first rendering color.

S4: Render the target pixel point by using the target rendering color.

Figure 10:
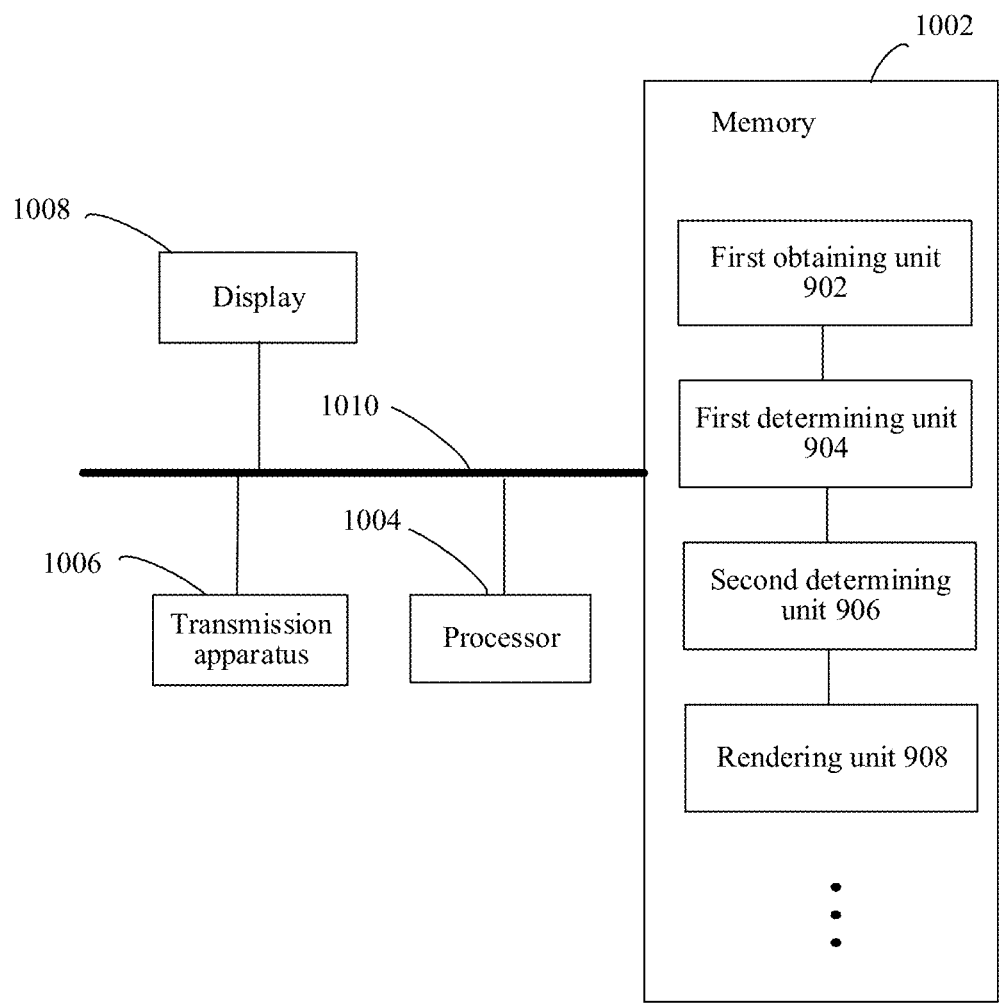
FIG. 10 is a schematic structural diagram of an electronic device according to an embodiment of this application.

In some embodiments, a person of ordinary skill in the art may understand that, the structure shown in FIG. 10 is only illustrative. The electronic device may be a terminal device such as a smartphone (for example, an Android mobile phone or an iOS mobile phone), a tablet computer, a palmtop computer, a mobile Internet device (MID), or a PAD. FIG. 10 does not constitute a limitation on the structure of the foregoing electronic device. For example, the electronic device may further include more or fewer components (such as a network interface) than those shown in FIG. 10, or have configuration different from that shown in FIG. 10.

The memory 1002 may be configured to store a software program and a module, for example, a program instruction/module corresponding to the object rendering method and apparatus in the embodiments of this application, and the processor 1004 performs various functional applications and data processing by running a software program and a module stored in the memory 1002, that is, implementing the foregoing object rendering method. The memory 1002 may include a high-speed random memory, and may further include a non-volatile memory such as one or more magnetic storage apparatuses, a flash memory, or another non-volatile solid-state memory. In some embodiments, the memory 1002 may further include memories remotely disposed relative to the processor 1004, and the remote memories may be connected to a terminal through a network. An example of the network includes, but is not limited to, the Internet, an intranet, a local area network, a mobile communication network, and a combination thereof. As an example, as shown in FIG. 10, the memory 1002 may include, but is not limited to, the first obtaining unit 902, the first determining unit 904, the second determining unit 906, and the rendering unit 908 in the foregoing object rendering apparatus. In addition, the memory 1002 may further include, but is not limited to, other module units in the foregoing object rendering apparatus, which are not described in this example.

In some embodiments, a transmission apparatus 1006 is configured to receive or transmit data via a network. Specific examples of the network may include a wired network and a wireless network. In an example, the transmission apparatus 1006 includes a network interface controller (NIC), which may be connected to another network device and router by using a cable, so as to communicate with the Internet or a local area network. In an example, the transmission apparatus 1006 is a radio frequency (RF) module, which communicates with the Internet using a wireless connection.

In addition, the electronic device may further include a display 1008; and a connection bus 1010, configured to connect the module components in the electronic device.

In other embodiments, the foregoing terminal or server may be a node in a distributed system. The distributed system may be a blockchain system. The blockchain system may be formed by a plurality of nodes through network communication. A peer to peer (P2P) network may be formed between nodes. Computing devices in any form, for example, a server and a terminal, and the like may become nodes in the blockchain system by joining the P2P network.

In some embodiments, in the embodiments, a person of ordinary skill in the art may understand that all or some procedures in the methods in the foregoing embodiments may be implemented by using a computer program instructing related hardware. The program may be stored in a non-volatile computer readable storage medium. When the program is executed, procedures of the embodiments of the foregoing methods may be included. References to the memory, the storage, the database, or other medium used in the embodiments provided in this application may all include a non-volatile or a volatile memory. The non-volatile memory may include a read-only memory (ROM), a programmable ROM (PROM), an electrically programmable ROM (EPROM), an electrically erasable programmable ROM (EEPROM) or a flash memory. The volatile memory may include a random access memory (RAM) or an external high-speed cache. For the purpose of description instead of limitation, the RAM is available in a plurality of forms, such as a static RAM (SRAM), a dynamic RAM (DRAM), a synchronous DRAM (SDRAM), a double data rate SDRAM (DDRSDRAM), an enhanced SDRAM (ESDRAM), a synchronous link (Synchlink) DRAM (SLDRAM), a RAM bus (Rambus) direct RAM (RDRAM), a direct Rambus dynamic RAM (DRDRAM), and a Rambus dynamic RAM (RDRAM).

The sequence numbers of the foregoing embodiments of this application are merely for description purpose but do not indicate the preference among the embodiments.

When the integrated unit in the foregoing embodiments is implemented in the form of a software function unit and sold or used as an independent product, the integrated unit can be stored in the foregoing computer-readable storage medium. Based on such an understanding, the technical solutions of this application essentially, or the part contributing to the prior art, or all or some of the technical solutions may be implemented in a form of a software product. The computer software product is stored in a storage medium and includes several instructions for instructing one or more computer devices (which may be a personal computer, a server, a network device, or the like) to perform all or some of the steps of the methods described in the embodiments of this application.

Each module/unit in various disclosed embodiments can be integrated in a processing unit, or each module/unit can exist separately and physically, or two or more modules/units can be integrated in one unit. The modules/units as disclosed herein can be implemented in the form of hardware (e.g., processing circuitry and/or memory) or in the form of software functional unit(s) (e.g., developed using one or more computer programming languages), or a combination of hardware and software.

In the foregoing embodiments of this application, descriptions of the embodiments have different emphases, and as for parts that are not described in detail in one embodiment, reference can be made to the relevant descriptions of the other embodiments.

In the several embodiments provided in this application, it is to be understood that the disclosed client may be implemented in another manner. The described apparatus embodiment is merely exemplary. For example, the unit division is merely logical function division and may be other division in implementations of various embodiments. For example, a plurality of units or components may be combined or integrated into another system, or some features may be ignored or not performed. In addition, the coupling, or direct coupling, or communication connection between the displayed or discussed components may be the indirect coupling or communication connection by means of some interfaces, units, or modules, and may be electrical or of other forms.

The units described as separate components may or may not be physically separate, and components displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in the form of hardware, or may be implemented in the form of a software function unit.

The above descriptions are merely preferred embodiments of this application, and a person of ordinary skill in the art may make various improvements and refinements without departing from the spirit of this application. All such modifications and refinements are also to be covered by this application.

What is claimed is:

1. An object rendering method, performed by an electronic device, the method comprising:
obtaining a target pixel point to be processed in a diffuse map and a normal map of a to-be-rendered object;
determining a first rendering color of the target pixel point according to input parameters of a pre-integration simulation function of a pre-integration simulation module, according to a light source direction parameter, and according to a normal direction parameter corresponding to the target pixel point, the pre-integration simulation module being configured to simulate a pre-integration map, the pre-integration map representing a correspondence between curvature and a color band, and the normal direction parameter representing a normal direction of the target pixel point in a world space coordinate system, wherein:
the input parameters of the pre-integration simulation function include a pre-integration color bright parameter, a pre-integration color dark parameter, a pre-integration range parameter, and a terminator position parameter,
the pre-integration simulation function simulates the pre-integration map according to the pre-integration color bright parameter, the pre-integration color dark parameter, the pre-integration range parameter, and the terminator position parameter,
the light source direction parameter represents a light source direction of a preset light source used during rendering of a to-be-rendered object,
the pre-integration range parameter represents a first integration range and a second integration range,
the pre-integration color bright parameter represents a first color in the first integration range, the pre-integration color dark parameter represents a second color in the second integration range, and the first color is brighter than the second color, and
the terminator position parameter represents a terminator position;
determining a target rendering color of the target pixel point according to the first rendering color; and
rendering the target pixel point by using the target rendering color.

2. The method according to claim 1, further comprising:
determining a second matte parameter according to the normal direction parameter and a second line-of-sight direction parameter, the second line-of-sight direction parameter representing a direction from a virtual camera used during rendering of the to-be-rendered object to the target pixel point; and
determining a third rendering color of the target pixel point according to a preset ambient light parameter and the second matte parameter;
wherein the determining a target rendering color of the target pixel point according to the first rendering color comprising: determining the target rendering color of the target pixel point according to the first rendering color and the third rendering color.

3. The method according to claim 2, wherein the determining a second matte parameter according to the normal direction parameter and a second line-of-sight direction parameter comprises:
performing a dot product on the normal direction parameter and the second line-of-sight direction parameter, and determining a result of the dot product as the second matte parameter.

4. The method according to claim 2, wherein the determining a third rendering color of the target pixel point according to a preset ambient light parameter and the second matte parameter comprises:
calculating a product of the preset ambient light parameter and the second matte parameter, and determining the third rendering color of the target pixel point according to the product.

5. The method according to claim 2, further comprising:
obtaining a target grayscale value of a diffuse reflection component of the target pixel point in the diffuse map;
determining a third matte parameter according to an AO color value and an AO grayscale value that correspond to the target pixel point and the target grayscale value; and
determining a highlight parameter according to the third matte parameter, a roughness parameter, the normal direction parameter, a light source direction parameter, and the second line-of-sight direction parameter, the light source direction parameter representing a light source direction of a preset light source used during rendering of the to-be-rendered object, and the roughness parameter being a parameter outputted through a preset channel of the diffuse map; and
wherein the determining the target rendering color of the target pixel point according to the first rendering color and the third rendering color comprising: determining the target rendering color of the target pixel point according to the first rendering color, the third rendering color, and the highlight parameter.

6. The method according to claim 5, wherein the determining a third matte parameter according to an AO color value and an AO grayscale value that correspond to the target pixel point and the target grayscale value comprises:
calculating the third matte parameter lerp based on a matte parameter calculation formula, the matte parameter calculation formula being lerp=a*(1−x)+b*x, wherein a represents the AO color value, b represents the target grayscale value, and x represents the AO grayscale value.

7. The method according to claim 5, wherein the determining the target rendering color of the target pixel point according to the first rendering color, the third rendering color, and the highlight parameter comprises:
- determining a sum of a value of the first rendering color, a value of the third rendering color, and a value of the highlight parameter, and determining the target rendering color according to the sum.

8. The method according to claim 5, further comprising:
- determining a backlighting color of the target pixel point according to the normal direction parameter, the light source direction parameter, a first line-of-sight direction parameter, and a subsurface transparency parameter, the subsurface transparency parameter being a parameter outputted through a preset channel of the normal map, and the first line-of-sight direction parameter representing a direction from the target pixel point to the virtual camera; and
- determining a second rendering color of the target pixel point according to the backlighting color and a first matte parameter, the first matte parameter being corresponded to a distance between the target pixel point and a central axis of the to-be-rendered object;
- wherein the determining the target rendering color of the target pixel point according to the first rendering color, the third rendering color, and the highlight parameter comprises: determining the target rendering color of the target pixel point according to the first rendering color, the second rendering color, the third rendering color, and the highlight parameter.

9. The method according to claim 8, wherein before the determining a second rendering color of the target pixel point according to the backlighting color and a first matte parameter, the method further comprises:
- obtaining a normal length L of a target axis corresponding to the target pixel point; and determining the first matte parameter as 1−L.

10. The method according to claim 8, wherein the determining a second rendering color of the target pixel point according to the backlighting color and a first matte parameter comprises:
- calculating a product of a value of the backlighting color and the first matte parameter, and determining the second rendering color according to the product.

11. The method according to claim 8, wherein the determining the target rendering color of the target pixel point according to the first rendering color, the second rendering color, the third rendering color, and the highlight parameter comprises:
- determining a sum of a value of the first rendering color, a value of the second rendering color, a value of the third rendering color, and a value of the highlight parameter, and determining the target rendering color of the target pixel point according to the sum.

12. The method according to claim 1, wherein before the determining a first rendering color of the target pixel point, the method further comprises:
- obtaining a first value of an R component of the target pixel point in the normal map and a second value of a G component in the normal map;
- determining a third value of a B component of the target pixel point in the normal map according to the first value and the second value; and
- determining the normal direction parameter according to the first value, the second value, and the third value.

13. The method according to claim 12, the determining a third value of a B component of the target pixel point in the normal map according to the first value and the second value comprises:
- determining the third value of the B component of the target pixel point in the normal map based on a value calculation formula, the value calculation formula being sqrt(1−dot(rg, rg)), wherein $$\mathrm{dot}(rg, rg) = r*r + g*g,\ \mathrm{sqrt}(x) = \sqrt{x};\ \text{and}$$

r represents the first value, and g represents the second value.

14. An object rendering apparatus, comprising: a memory storing computer program instructions; and a processor coupled to the memory and configured to execute the computer program instructions and perform:
- obtaining a target pixel point to be processed in a diffuse map and a normal map of a to-be-rendered object;
- determining a first rendering color of the target pixel point according to input parameters of a pre-integration simulation function of a pre-integration simulation module, according to a light source direction parameter, and according to a normal direction parameter corresponding to the target pixel point, the pre-integration simulation module being configured to simulate a pre-integration map, the pre-integration map representing a correspondence between curvature and a color band, and the normal direction parameter representing a normal direction of the target pixel point in a world space coordinate system, wherein:
  - the input parameters of the pre-integration simulation function include a pre-integration color bright parameter, a pre-integration color dark parameter, a pre-integration range parameter, and a terminator position parameter,
  - the pre-integration simulation function simulates the pre-integration map according to the pre-integration color bright parameter, the pre-integration color dark parameter, the pre-integration range parameter, and the terminator position parameter,
  - the light source direction parameter represents a light source direction of a preset light source used during rendering,
  - the pre-integration range parameter represents a first integration range and a second integration range,
  - the pre-integration color bright parameter represents a first color in the first integration range, the pre-integration color dark parameter represents a second color in the second integration range, and the first color is brighter than the second color, and
  - the terminator position parameter represents a terminator position;
- determining a target rendering color of the target pixel point according to the first rendering color; and
- rendering the target pixel point by using the target rendering color.

15. The apparatus according to claim 14, further comprising:
- determining a second matte parameter according to the normal direction parameter and a second line-of-sight direction parameter, the second line-of-sight direction parameter representing a direction from a virtual camera used during rendering of the to-be-rendered object to the target pixel point; and determining a third rendering color of the target pixel point according to a preset ambient light parameter and the second matte parameter;

wherein the processor is further configured to perform determining the target rendering color of the target pixel point according to the first rendering color and the third rendering color.

16. The apparatus according to claim 15, wherein the processor is further configured to perform:

performing a dot product on the normal direction parameter and the second line-of-sight direction parameter, and determine a result of the dot product as the second matte parameter.

17. A non-transitory computer-readable storage medium, the computer-readable storage medium storing computer programs, when executed by one or more processors, the computer programs cause the one or more processors to perform a method comprising:

obtaining a target pixel point to be processed in a diffuse map and a normal map of a to-be-rendered object;

determining a first rendering color of the target pixel point according to input parameters of a pre-integration simulation function of a pre-integration simulation module, according to a light source direction parameter, and according to a normal direction parameter corresponding to the target pixel point, the pre-integration simulation module being configured to simulate a pre-integration map, the pre-integration map representing a correspondence between curvature and a color band, and the normal direction parameter representing a normal direction of the target pixel point in a world space coordinate system, wherein:

the input parameters of the pre-integration simulation function include a pre-integration color bright parameter, a pre-integration color dark parameter, a pre-integration range parameter, and a terminator position parameter, the pre-integration simulation function simulates the pre-integration map according to the pre-integration color bright parameter, the pre-integration color dark parameter, the pre-integration range parameter, and the terminator position parameter, the light source direction parameter represents a light source direction of a preset light source used during rendering, the pre-integration range parameter represents a first integration range and a second integration range, the pre-integration color bright parameter represents a first color in the first integration range, the pre-integration color dark parameter represents a second color in the second integration range, and the first color is brighter than the second color, and the terminator position parameter represents a terminator position;

determining a target rendering color of the target pixel point according to the first rendering color; and rendering the target pixel point by using the target rendering color.

* * * * *